July 28, 1953 E. L. PRIZER 2,646,973
APPARATUS FOR INTRODUCING SOLUBLE AGENTS INTO LIQUIDS
Filed June 30, 1952 3 Sheets-Sheet 1

INVENTOR.
Eugene L. Prizer
ATTORNEYS.

July 28, 1953  E. L. PRIZER  2,646,973
APPARATUS FOR INTRODUCING SOLUBLE AGENTS INTO LIQUIDS
Filed June 30, 1952  3 Sheets-Sheet 2

INVENTOR.
Eugene L. Prizer
BY
Knight + Rodgers
ATTORNEYS.

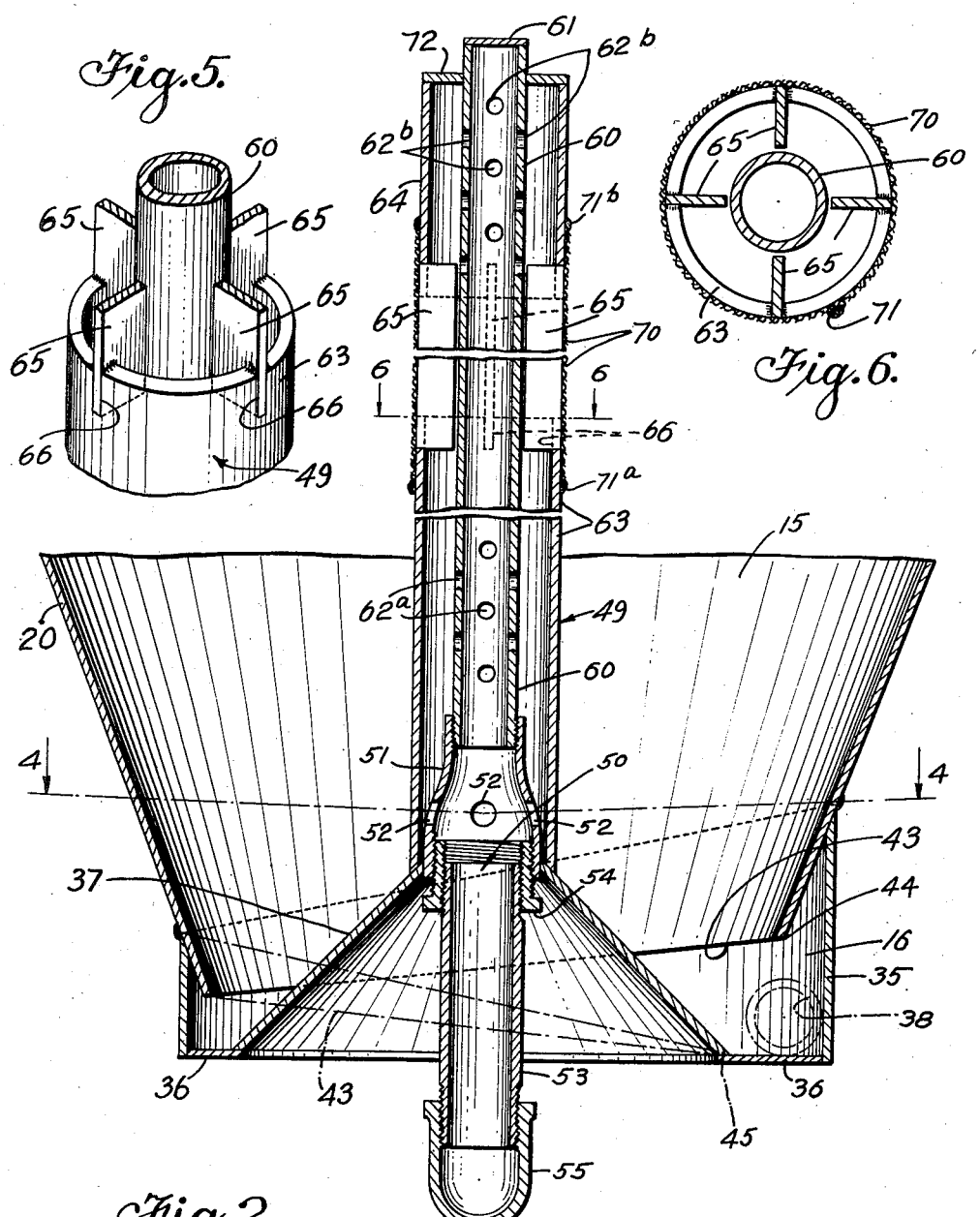

Patented July 28, 1953

2,646,973

UNITED STATES PATENT OFFICE 2,646,973

APPARATUS FOR INTRODUCING SOLUBLE AGENTS INTO LIQUIDS

Eugene L. Prizer, Escondido, Calif., assignor of twenty-five per cent to J. A. Prizer, Fullerton, twenty-five per cent to Murray Ferguson, Compton, ten per cent to Edgar D. Boal, Bonita, and ten per cent to Marston Burnham, La Jolla, Calif.; Beatrice C. Prizer, executrix of said Eugene L. Prizer, deceased Application June 30, 1952, Serial No. 296,454

(19 Claims. (Cl. 259—4)

This invention relates to devices for dissolving and gradually introducing soluble solid materials into liquids.

While the invention is widely applicable and may be used to dissolve various solids and semi-solids for various specific purposes, it has outstanding advantages in agriculture usage for the distribution of solid treating agents such as commercial fertilizers, soil treating agents, pest poisons, fungus retardants, etc. For the purpose of disclosure the invention will be described as embodied in an applicator for introducing fertilizers and other treating agents into an irrigating system or a sprinkling system, since such a disclosure will provide adequate guidance for those skilled in the art who may have occasion to apply the same principles to other specific purposes.

The general object of this selected practice of the invention is to provide a device which may be connected to the water line of an irrigation or sprinkler system to effect gradual dissolution of solid materials into the flowing water without unduly lowering the water pressure or otherwise adversely affecting the system.

One object of the invention is to provide a dissolving and dispersing action which may be utilized effectively to distribute solids varying widely in solubility, including, on the one hand, such readily soluble materials as urea, ammonium sulfate, ammonium phosphate, sodium nitrate, et cetera, and, on the other hand, such slowly soluble materials as gypsum and hydrated lime.

A more specific object of the invention is to provide means for gradually dissolving and dispersing a mass of solid material in a liquid by feeding the mass gravitationally down a suitably steep slope in a gradual manner into a swift continuous stream of the liquid. A further object in the preferred practice of the invention is to achieve additional dissolution and dispersal by directing the material-laden liquid from the swift stream upward through the mass of solid material.

A further object of the invention is to provide an applicator of the character described that is simple in structure, inexpensive to manufacture, easy to clean and maintain, and may be filled with a liberal supply of material to function at high efficiency over a relatively long service period without further attention.

Broadly described, the objects of the invention are attained by providing an open bottom supply compartment having a sloping peripheral wall leading downward for the gravitational movement of solids into what may be termed a vortical compartment where the solids are eroded and dissolved by liquid flowing in a vortex or swift rotary stream. The bottom edge of the sloping peripheral wall extends downwardly progressively, preferably in a contracting spiral in the direction of fluid rotation to progressively intercept the vortex. Thus the sloping wall has the dual function of guiding solids into the vortex and of diverting the fluid from the vortex upwardly through at least a portion of the mass of solid material. Preferably, but not necessarily, the rotary stream is confined in an annular channel which is progressively reduced in cross-section to cooperate with the progressively intercepting wall thereby to progressively displace the rotary fluid upward into the supply compartment. In the preferred practice of the invention complete diversion of the rotating liquid is accomplished in one rotation, liquid entering the vortical compartment tangentially and being completely displaced above the level of its entrance after flowing through a complete circle.

The various objects and advantages of the invention may be fully understood from the following detailed description considered with the accompanying drawings.

In the drawings, which are to be regarded as merely illustrative,

Fig. 2 is a vertical section on an enlarged scale taken as indicated by the line 2—2 of Fig. 1, with an intermediate portion of the central outlet assembly broken away;

Fig. 5 is a fragmentary perspective view on an enlarged scale showing the construction of a central outlet assembly; and Fig. 6 is a horizontal section taken as indicated by the line 6—6 of Fig. 2.

Figure 1:
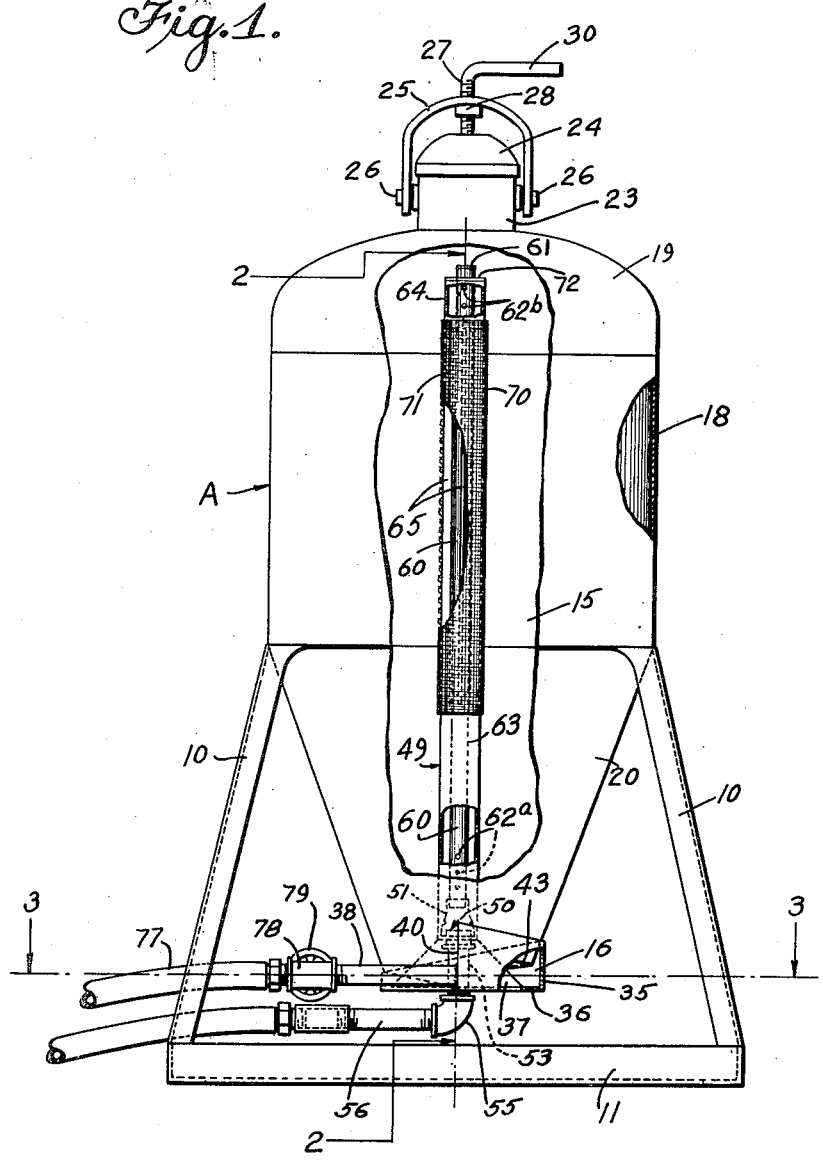
Fig. 1 is a side elevation of a presently preferred embodiment of the invention with parts broken away to reveal concealed structure.
Figure 3:
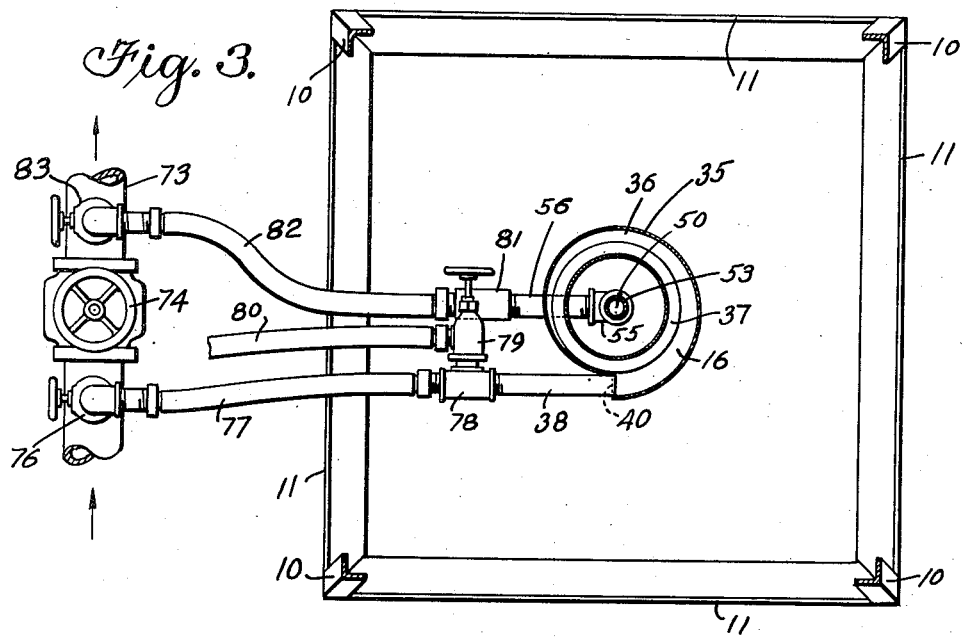
Fig. 3 is a horizontal section taken substantially as indicated by the line 3—3 of Fig. 1.

The selected embodiment of the invention shown in the drawings comprises a closed container A which, as best shown in Figs. 1 and 3, may be supported in somewhat elevated position by an angle iron frame comprising four legs 10 and a rectangular base 11. The container, which may be of various configurations, is preferably designed to withstand substantial internal pressure. Broadly described the container comprises an upper supply compartment generally designated 15 and what may be termed a lower vortical liquid inlet compartment generally designated 16. The supply compartment 15 which is intended to hold a suitable quantity of the soluble solid material is open at the bottom to permit the material to feed gravitationally into the vortical compartment 16.

The present container construction, best shown in Fig. 1, includes an upright cylindrical wall 18, a dished head or top wall 19, and a lower peripheral conical wall 20 that tapers downward to feed the solid material gravitationally to the vortical compartment 16. The slope of the conical wall 20 may, for example, be 70° relative to horizontal for satisfactory gravitational feed of the solid material downward as well as satisfactory upward flow of liquid from the vortical compartment through at least a portion of the supply mass of solid material.

For access to the interior of the container and for introduction of the solid material, a suitable opening may be provided, for example by a collar 23. The fill opening provided by the collar 23 is normally closed in a fluid tight manner by a suitable cover 24, the fluid tight seal being provided by a suitable gasket (not shown). In the construction shown a bail 25 of suitable bar material is pivotally mounted on the collar 23 by suitable trunnions 26 and carries a screw 27 which is normally tightened down to hold the cover 24 in place. The screw 27 is threaded through a nut 28 carried by the bail 25 and is bent at an angle to form a convenient handle 30.

The peripheral conical wall 20 is cut away to form the bottom opening for the supply compartment 15 and as best shown in Fig. 2 the structure forming the vortical compartment 16 surrounds the conical wall and is bonded thereto in a fluid tight manner, for example by welding. The structure of the vortical compartment 16 includes an outer upright wall 35, a flat bottom wall 36, and a reentrant bottom wall in the form of a cone 37 which extends upward into the supply compartment 15. It is apparent that this inner conical wall 37 like the peripheral conical wall 20 guides material gravitationally downward from the supply compartment to the vortical compartment. The slope of the conical wall 37 may be approximately 45° from horizontal for satisfactory guidance with respect to downward feed movement of the solid material and upward flow of the liquid through the solid material.

Figure 4:
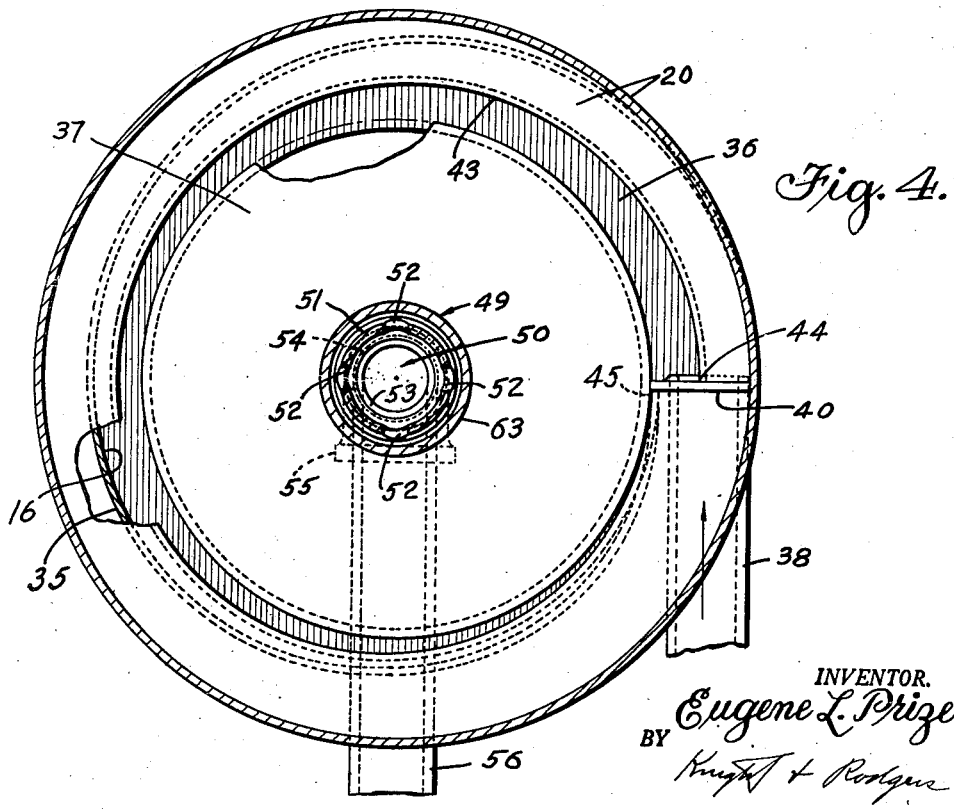
Fig. 4 is a horizontal section taken as indicated by the line 4—4 of Fig. 2.

It is apparent that by virtue of the described structure the vortical compartment 16 provides a channel that is of curved configuration in plan, the outer upright wall 35 forming one side of the channel, the continuous conical wall 37 forming the other side of the channel and the flat bottom wall 36 forming the floor of the channel. It is contemplated that the liquid stream will be introduced into the vortical compartment 16 in a manner to create a vortex by flow through the channel in a counter-clockwise direction as viewed from above. For this purpose the vortical compartment 16 may have a suitable tangential inlet. Thus as best shown in Figs. 3 and 4 an inlet nipple 38 may be mounted by welding in a radial wall 40 at what may be termed the inlet end of the curved channel.

To divert the counter-clockwise flowing liquid in the vortical compartment 16 upward into the supply compartment 15 the conical peripheral wall 20 extends progressively downwardly into the described curved channel, the progressiveness of the intrusion of the conical wall being in the same counter-clockwise direction as the rotary flow of the liquid. For this purpose the bottom edge 43 of the conical peripheral wall 20 may form a downward counter-clockwise contracting spiral as may be understood by reference to Figs. 2 and 4 where it can be seen that the spiral starts at a high point 44 and in substantially one revolution terminates at a low point 45, the two ends of the spiral terminating adjacent the radial wall 40.

While the downward spiral extension of the conical wall 20 into the vortical compartment 16 may be depended upon alone to divert the rotating liquid upward into the supply compartment 15 in the desired manner, preferably the channel is progressively narrowed or restricted in cross-sectional area with respect to the same rotary direction to cause displacement of the rotating liquid upward into the supply compartment. Such a progressively diminishing configuration may be provided, for example, by making the outer upright wall 35 of the vortical compartment conform to an inwardly contracting counter-clockwise spiral as shown in full lines in Fig. 3 and in dotted lines in Fig. 4. Thus in the preferred construction shown the upright outer wall 35, in effect, makes one complete turn to terminate at the same point 45 as the downwardly spiralling peripheral wall 20 and the floor 36 of the channel tapers to the same point. Thus all the liquid flowing counter-clockwise in the channel is displaced inward and upward along the inner conical wall 37 to spiral upward towards and along the inner sloping surface of the peripheral conical wall 20.

Any suitable outlet arrangement may be provided to release liquid from the supply compartment 15, preferably at an upper level of the compartment. By way of example the drawings show a central outlet assembly including an upright, concentric outlet tube, generally designated 49. The outlet tube 49 is in the supply compartment 15 and communicates with an outlet port, generally designated 50, in the conical bottom wall 37. The outlet port 50 may be formed by a suitable reducing sleeve or coupling 51, the coupling being welded in place and preferably provided with peripheral ports 52. To carry fluid away from the outlet port 50 a suitable nipple 53 is mounted in the reducing sleeve 51 by means of a bushing 54 and the nipple 53 is threaded into an elbow 55 which in turn connects with a horizontal outlet nipple or pipe 56 (Fig. 1).

Threaded into the upper end of the reducing sleeve 51 inside the outlet tube 49 is an inner tube or pipe 60 that is closed at its upper end by an end plate 61 and is provided with a plurality of ports, preferably comprising a plurality of ports 62a adjacent its lower end and a plurality of ports 62b adjacent its upper end, the tube 60 being preferably imperforate between these two groups of ports and throughout the major portion of its height.

It is contemplated that the outlet tube 49 will be adapted in any suitable manner to receive and release liquid from the supply compartment 15 through suitable screen means to hold back the solid material. In the construction shown, the outlet tube 49 is divided for this purpose into a lower section 63 and an upper section 64, the two sections being spaced apart vertically and united by a plurality of radial plates 65. As best shown in Fig. 5 each of the two sections 63 and 64 of the outlet tube 49 may be formed with end slots 66 to receive the radial plates 65, the radial plates being welded to the tube sections at the slots. By this construction the radial plates 65 form vertically extensive openings for adequate flow of liquid from the interior of the supply compartment into the outlet tube 49 to escape through the ports 52, 62a and 62b into inner tube 60 and thence through outlet port 50.

The required screen means to hold back solids may comprise a sheet of suitable screen material, for example 20 mesh screen, which sheet is formed into a sleeve 70 with a soldered joint as indicated at 71. The cylindrical screen sleeve 70 extends throughout the height of the radial plates 65 between the lower and upper tube sections 63 and 64 and is secured to said tube sections as by soldering at 71a and 71b. The sleeve snugly embraces the outlet tube 49 in the region of the radial plates 65, the radial plates serving as internal braces to resist inward pressure on the screen material.

It is contemplated that the outlet tube 49 along with the screen 70 will be removable as a unit. To permit such removal, the outlet tube rests on the conical wall 37 with the reducing coupling 51 serving as a centering means and the upper end of the outlet tube is closed by an end plate 72, that is centrally apertured to removably embrace the inner tube 60. Preferably the lower end of the outlet tube 49 is bevelled to conform with the slope of the conical wall 37 as may be seen in Fig. 2.

For service with a sprinkling or irrigating system the described apparatus may be operatively associated with a water main 73 in the manner indicated by Fig. 3. It is contemplated that the apparatus will be connected to two points along the water main with suitable provision for the creation of a pressure differential between the two points for utilization in creating circulation through the apparatus. Various well known expedients may be used for this purpose.

For example a suitable valve 74, such as a gate valve, may be placed in the water main 73, which valve may be closed to any degree desired to create the pressure difference.

In the construction shown in Fig. 3 an inlet valve 76 connected to the water main 73 on the upstream side of the valve 74 is connected to a hose 77 and the hose, in turn, is connected with the previously mentioned inlet nipple 38 by means of a T 78. The purpose of the T 78 is to carry a drainage valve 79 which is shown connected to a drainage hose 80. It is apparent that with the inlet valve 76 closed, the drainage valve 79 may be opened to release liquid from the bottom of the apparatus. In like manner the previously mentioned outlet nipple 56 is shown connected by a coupling 81 and a hose 82 to a suitable outlet valve 83 that communicates with the water main 73 on the downstream side of the water main valve 74.

The manner in which the apparatus operates may be readily understood from the foregoing description. With the two water circulation valves 76 and 83 closed, the cover 24 may be removed to permit a supply of the soluble solid material to be introduced into the supply compartment 15. The size of the individual pieces of the solid material will ordinarily vary in accord with the readiness with which the material will dissolve in the liquid. Highly soluble material may be in pieces ¼ inch in cross dimension or larger. More slowly soluble material may be less than ⅛ inch in cross dimension or, in some instances, may be even more finely divided, so long as the mesh of the screen material 70 is smaller than the solid particles.

When the apparatus has been charged with the solid material it is usually desirable to at least partially fill the supply compartment 15 with liquid. For this purpose the inlet valve 76 may be opened long enough to bring the liquid level to the desired height before closing the apparatus for operation.

To place the apparatus in operation the inlet valve 76 and the outlet valve 83 are both opened with the drainage valve 79 closed. The water main valve 74 is adjusted for the desired pressure differential which is usually of a magnitude less than two pounds per square inch. Because of the pressure differential, water flows through the apparatus at a rate to create a relatively high velocity vortex in the vortical compartment 16 as heretofore explained. Material continually gravitates down both conical walls 20 and 37 for constant dissolution in the vortex and, as previously explained, the vortex stream is diverted and displaced to swirl upward into the lower conical portion of the supply compartment 15 where the liquid threads its way through the voids and interstices formed by the solid material. The material-laden water passes through the screen material 70 into the outlet tube 49 and passing through the ports 62a, 62b and 52 reaches the outlet port 50, and is returned to the water main 73 where it is mixed with the main water stream passing through valve 74.

The invention is characterized by surprising effectiveness of a relatively low rate of liquid circulation. One reason for such efficiency is that the vortical compartment 16 is designed for sustained effectiveness throughout its circumferential extent. In this regard it is to be noted that while the liquid tends to be continually diverted out of the vortex channel by the downwardly extending wall 20, nevertheless the cross-sectional area of the channel diminishes to maintain effective velocity on the part of the remaining vortex liquid.

All parts of the apparatus that tend to accumulate material in the course of operation are readily accessible for inspection, servicing or cleaning. With the cover 24 removed it is a simple matter to lift the outlet tube 49 along with its screen 70 out of the apparatus and, if desired, the inner tube 60 may be unscrewed and removed also.

My description in specific detail of the presently preferred embodiment of the invention will suggest to those skilled in the art various changes, substitutions and other departures from my disclosure that properly lie within the spirit and scope of the appended claims.

I claim:

1. A mixing apparatus for solid materials such as fertilizers, treating agents and the like to introduce said materials into a liquid, said mixing apparatus having: a supply compartment to hold a supply of said material, said compartment being open at the bottom for gravitational movement of solid material downward therefrom; walls defining a lower compartment of vortical shape below said supply compartment and open thereto to receive solid material therefrom; a fluid inlet positioned to introduce fluid substantially tangentially into said lower compartment to form a stream rotating around the lower compartment for circulation upward into said supply compartment; and means to release fluid laden with said material from the supply compartment; said supply compartment having a peripheral wall extending downward into said lower compartment, the lower edge of said peripheral wall descending into said lower compartment progressively in the direction of rotation of said stream to progressively intercept the stream thereby to divert the liquid upward from the lower compartment into the supply compartment.

2. A mixing apparatus as set forth in claim 1 in which the walls of said lower compartment include an outer wall forming a spiral contracting in said direction of rotation to cooperate with said downwardly extending peripheral wall of the supply compartment for displacement of said stream out of the lower compartment.

3. A mixing apparatus as set forth in claim 2 in which said downwardly extending peripheral wall extends downward in a spiral and both the spiral of said downwardly extending wall and the spiral of said outer wall start and end circumferentially in the region of said fluid inlet.

4. A mixing apparatus for solid materials such as fertilizers, treating agents and the like to introduce said materials into a liquid, said mixing apparatus having: a supply compartment to hold a supply of said material, said supply compartment having a curved peripheral wall, said peripheral wall sloping inward and downward to form a bottom opening for the compartment at the lower edge of said wall; walls defining a lower compartment of vortical shape below said supply compartment, including an inner continuous wall and an outer wall surrounding said inner wall to define a flow channel extending circumferentially around the lower edge of said peripheral wall and communicating with said bottom opening, said lower edge spiralling downward into said channel to progressively intercept fluid therein; a fluid inlet positioned to introduce fluid substantially tangentially into said lower compartment to create a liquid vortex therein; and a fluid outlet to release fluid laden with said material from the supply compartment.

5. A mixing apparatus as set forth in claim 4 in which the downward spiral of the lower edge of said peripheral wall begins in the region of said fluid inlet.

6. A mixing apparatus as set forth in claim 4 in which said channel progressively decreases in cross-sectional area in the direction of rotation of said vortex.

7. A mixing apparatus as set forth in claim 6 in which the maximum cross-sectional dimension of said channel and the beginning of the downward spiral of the lower edge of said peripheral wall are in the region of said fluid inlet.

8. A mixing apparatus as set forth in claim 4 in which said inner wall of the lower compartment is conical.

9. A mixing apparatus as set forth in claim 8 in which said peripheral wall of the supply compartment is conical and coaxial with said inner wall.

10. A mixing apparatus as set forth in claim 4 in which the lower edge of said peripheral wall spirals downwardly from a region adjacent said outer wall of the lower compartment and progressively approaches said inner wall of the lower compartment.

11. A mixing apparatus as set forth in claim 10 in which said inner wall of the lower compartment is substantially circular in plan and the lower edge of said peripheral wall spirals downwardly with contracting curvature to approach said circular inner wall.

12. A mixing apparatus for solid materials such as fertilizers, treating agents and the like to introduce said materials into a liquid, said mixing apparatus having: a supply compartment to hold a supply of said material, said compartment being open at the bottom for gravitational movement of solid material downward therefrom, said compartment having a conical peripheral wall tapering downward to its bottom opening; a vortical compartment below said supply compartment and open thereto to receive solid material therefrom, said vortical compartment having a bottom wall at least a portion of which is a reentrant cone concentric to said peripheral wall and having an outer wall embracing the lower portion of said peripheral wall thereby forming a channel around said bottom opening, said outer wall being curved eccentrically of said reentrant cone to progressively narrow said channel in one circumferential direction, the bottom edge of said peripheral wall spiralling downward into said channel in the same circumferential direction; a fluid inlet directed into a relatively wide portion of said channel in said circumferential direction; and a fluid outlet to release fluid from the mixing apparatus.

13. A mixing apparatus as set forth in claim 12 in which said bottom edge terminates adjacent said reentrant cone.

14. A mixing apparatus as set forth in claim 13 in which said peripheral wall and said outer wall meet at said reentrant cone.

15. A mixing apparatus for solid materials such as fertilizers, treating agents and the like to introduce said materials into a liquid, said mixing apparatus having: a supply compartment to hold a supply of said material, said compartment being open at the bottom for gravitational movement of solid material downward therefrom, said compartment having a conical wall tapering downward to its bottom opening; walls defining a lower compartment of vortical shape below said supply compartment and open thereto to receive solid material therefrom, said walls of the lower compartment including a reentrant bottom wall and an outer wall embracing the lower portion of said conical wall, the bottom edge of said conical wall forming a downward spiral extending downward into said lower compartment with contracting curvature; an upright tube mounted on the upper portion of said reentrant bottom wall to form a downflow passage from said supply compartment; a fluid inlet to direct fluid substantially tangentially into said lower compartment for rotation therein; and an outlet in said reentrant bottom wall at the lower end of said downflow passage.

16. A mixing apparatus for solid materials such as fertilizers, treating agents and the like to introduce said materials into a liquid, said mixing apparatus having: a supply compartment to hold a supply of said material, said compartment being open at the bottom for gravitational movement of solid material downward therefrom, said compartment having a conical peripheral wall tapering downward to its bottom opening; a vortical compartment below said supply compartment and opened thereto to receive solid material therefrom, said vortical compartment having an outer wall and having a bottom wall with a central reentrant portion forming with said outer wall a channel extending around said bottom opening, the bottom edge of said peripheral wall extending spirally downward into said channel with contracting curvature; a fluid inlet positioned to introduce fluid into said vortical compartment to form a stream rotating in said channel; an upright tube mounted on said reentrant portion to form a downflow passage from said supply compartment; and a fluid outlet in said reentrant portion at the lower end of said passage.

17. A mixing apparatus as set forth in claim 15 in which at least a portion of said tube is foraminous to admit fluid peripherally from said supply compartment.

18. A mixing apparatus as set forth in claim 17 in which a second tube extends upward from said reentrant portion inside said first mentioned tube, said second tube communicating with said outlet and being foraminous to receive fluid from the interior of the first mentioned tube.

19. A mixing apparatus as set forth in claim 18 in which said outer tube removably surrounds said inner tube.

EUGENE L. PRIZER.

References Cited in the file of this patent

UNITED STATES PATENTS

| Number | Name | Date |
|---|---|---|
| 1,025,206 | Rounds | May 7, 1912 |
| 1,613,531 | Pfisterer | Jan. 4, 1927 |
| 1,755,437 | Fazio | Apr. 22, 1930 |
| 1,769,904 | Bagley | July 1, 1930 |
| 2,057,478 | Cowles | Oct. 13, 1936 |
| 2,391,858 | Auer | Jan. 1, 1946 |
| 2,528,514 | Harvey et al. | Nov. 7, 1950 |